US012567151B2

(12) United States Patent
Amthor et al.

(10) Patent No.: US 12,567,151 B2
(45) Date of Patent: Mar. 3, 2026

(54) MICROSCOPY SYSTEM AND METHOD FOR INSTANCE SEGMENTATION

(71) Applicant: Carl Zeiss Microscopy GmbH, Jena (DE)

(72) Inventors: Manuel Amthor, Jena (DE); Daniel Haase, Zoellnitz (DE)

(73) Assignee: Carl Zeiss Microscopy GmbH, Jena (DE)

( * ) Notice: Subject to any disclaimer, the term of this patent is extended or adjusted under 35 U.S.C. 154(b) by 348 days.

(21) Appl. No.: 17/954,417

(22) Filed: Sep. 28, 2022

(65) Prior Publication Data

US 2023/0104859 A1 Apr. 6, 2023

(30) Foreign Application Priority Data

Oct. 1, 2021 (DE) ..................... 10 2021 125 575.9

(51) Int. Cl.
 *G06T 7/11* (2017.01)
 *G06T 7/12* (2017.01)
 *G06V 10/82* (2022.01)
 *G06V 20/69* (2022.01)

(52) U.S. Cl.
 CPC .................. *G06T 7/11* (2017.01); *G06T 7/12* (2017.01); *G06T 2207/10056* (2013.01); *G06T 2207/30024* (2013.01)

(58) Field of Classification Search
 CPC ... G06T 7/11; G06T 7/12; G06T 2207/10056; G06T 2207/30024; G06T 2207/20164; G06V 10/82; G06V 20/69
 See application file for complete search history.

(56) References Cited

U.S. PATENT DOCUMENTS

| | | | | |
|---|---|---|---|---|
| 2010/0290692 A1* | 11/2010 | Macaulay | ............. | G06T 7/0012 |
| | | | | 382/133 |
| 2011/0274314 A1* | 11/2011 | Yang | ....................... | G06T 7/194 |
| | | | | 382/103 |
| 2012/0321172 A1* | 12/2012 | Jachalsky | ............... | G06T 7/593 |
| | | | | 382/154 |

(Continued)

FOREIGN PATENT DOCUMENTS

| | | | | |
|---|---|---|---|---|
| JP | 2018060389 A | * | 4/2018 | |
| WO | WO-2021076605 A1 | * | 4/2021 | ........... G06V 20/695 |

OTHER PUBLICATIONS

Carpenter, Anne E., et al. CellProfiler: image analysis software for identifying and quantifying cell phenotypes. Genome biology, 2006, 7. Jg., S. 1-11.

(Continued)

*Primary Examiner* — Amandeep Saini
*Assistant Examiner* — Andrew S Budisalich
(74) *Attorney, Agent, or Firm* — LaBatt, LLC

(57) ABSTRACT

A computer-implemented method for instance segmentation of at least one microscope image showing a plurality of objects, comprising: calculating positions of object centers of the objects in the microscope image; determining which image areas of the microscope image are covered by the objects; calculating Voronoi regions using the object centers as Voronoi sites; and determining an instance segmentation mask by separating the image areas covered by the objects into different instances using boundaries of the Voronoi regions.

20 Claims, 6 Drawing Sheets

(56)       References Cited

U.S. PATENT DOCUMENTS

| | | | | |
|---|---|---|---|---|
| 2013/0064443 | A1* | 3/2013 | Schlosser | G06T 7/593 |
| | | | | 382/154 |
| 2016/0117836 | A1* | 4/2016 | Dubrovina | G06T 7/60 |
| | | | | 382/173 |
| 2020/0082541 | A1* | 3/2020 | Jouppi | G06T 7/194 |
| 2020/0320699 | A1* | 10/2020 | Guetter | G06T 7/0012 |
| 2020/0368288 | A1* | 11/2020 | Tomer | G01N 33/5008 |
| 2021/0166387 | A1* | 6/2021 | Chatterjea | G06T 7/0012 |
| 2021/0166400 | A1* | 6/2021 | Goel | G06V 10/7747 |
| 2022/0058369 | A1* | 2/2022 | Alahmari | G06F 18/285 |
| 2022/0058370 | A1* | 2/2022 | Tsang Min Ching | G06T 7/12 |
| 2022/0198209 | A1* | 6/2022 | Spears | G06V 10/454 |

OTHER PUBLICATIONS

Chen, Xu, et al. A novel geodesic distance based clustering approach to delineating boundaries of touching cells. In: Advances in Neural Networks—ISNN 2013: 10th International Symposium on Neural Networks, Dalian, China, Jul. 4-6, 2013, Proceedings, Part II 10. Springer Berlin Heidelberg, 2013. S. 315-322.

CellProfiler™ cell image analysis software. Handbook. 2006. URL: https://static-content.springer.com/esm/art%3A10.1186%2Fgb-2006-7-10-r100/MediaObjects/13059_2006_1368_MOESM1_ESM.pdf [retrieved on Sep. 2, 2023].

Lamprecht, Michael R.; Sabatini, David M.; Carpenter, Anne E. CellProfiler™: free, versatile software for automated biological image analysis. Biotechniques, 2007, 42. Jg., Nr. 1, S. 71-75.

Matuszewski, Bogdan J., et al. Segmentation of cellular structures in actin tagged fluorescence confocal microscopy images. In: 2011 18th IEEE International Conference on Image Processing. IEEE, 2011. S. 3081-3084.

Saha, Monjoy; Chakraborty, Chandan. Her2Net: A deep framework for semantic segmentation and classification of cell membranes and nuclei in breast cancer evaluation. IEEE Transactions on Image Processing, 2018, 27. Jg., Nr. 5, S. 2189-2200.

Voronoi diagram. In: Wikipedia, The Free Encyclopedia. Bearbeitungsstand: Sep. 19, 2021, 13:24 UTC. URL: https://en.wikipedia.org/w/index.php?title=Voronoi_diagram&oldid=1045220950 [retrieved on Jan. 26, 2023].

Xie, Weidi ; Noble, J. Alison ; Zisserman, Andrew: Microscopy cell counting and detection with fully convolutional regression networks. In: Computer Methods in Biomechanics and Biomedical Engineering: Imaging & Visualization, Bd. 6, 2018, H. 3, S. 283-292.

Search Report for German Application No. 10 2021 125 575.9 (English translation not available), Feb. 14, 2023, 11 pages.

Wikipedia, "Expectation—maximization algorithm", last edited Aug. 15, 2021, website accessed Jul. 3, 2022, 14 pages.

Xie, Weidi J. et al, "Microscopy Cell Counting with Fully Convolutional Regression Networks", Department of Engineering Science, Univeristy of Oxford, UK, Computer Methods in Biomechanics and Biomedical Engineering: Imaging & Visualization, 2018, 8 pages.

Wikipedia, "Dijkstra's algorithm", last edited Sep. 29, 2021, 13 pages.

Cohen, Joseph Paul et al, "Count-ception: Counting by Fully Convolutional Redundant Counting", Jul. 23, 2017, 9 pages.

Lê, Ngoc-Minh, "Randomized Incremental Construction of Simple Abstract Voronoi Diagrams in 3-space", Informatik—Berichte 174—Mar. 1995, FernUniversität in Hagen, 17 pages.

Wikipedia, "Voronoi diagram", last edited Sep. 19, 2021, website accessed on Jul. 3, 2022, 16 pages.

Schmidt, Uwe et al, "Cell Detection with Star-convex Polygons", Max Planck Institute of Molecular Cell Biology and Genetics, Nov. 8, 2018, 8 pages.

* cited by examiner

MICROSCOPY SYSTEM AND METHOD FOR INSTANCE SEGMENTATION

REFERENCE TO RELATED APPLICATIONS

The current application claims the benefit of German Patent Application No. 10 2021 125 575.9, filed on 1 Oct. 2021, which is hereby incorporated by reference.

TECHNICAL FIELD OF THE DISCLOSURE

The present disclosure relates to a microscopy system and a method for an instance segmentation of a microscope image.

BACKGROUND OF THE DISCLOSURE

The importance of digital image processing in modern microscopes, in particular for an automatic sample analysis or an automatic microscope control based on captured images, is continuously increasing. For various processes, an instance segmentation mask is advantageous. A segmentation mask is understood in the present disclosure as an image in which a class is indicated for each area or each pixel. A segmentation mask can in particular be a binary mask in which a first pixel value indicates that corresponding pixels belong to a first class (e.g., to the class "sample" or more generally "object"), while a second pixel value indicates that corresponding pixels belong to a second class (e.g., to the class "non-sample" or "background"). A segmentation mask is typically calculated from a captured microscope image, e.g., a phase contrast image or a fluorescence image. Contiguous image areas that display different objects of the same class are not subdivided into instances in a segmentation mask, since each pixel of these image areas has the same pixel value. Segmentation masks consequently do not display whether one or more neighboring objects of the same class are present and where a boundary runs between them. An instance segmentation mask differs in this regard: not only is a class indicated for each area or each pixel in an instance segmentation mask, but objects of the same class are also discriminated from one another. In instance segmentation masks, a class is thus assigned to each pixel while it is additionally specified which object is present here from among a potential plurality of objects of the same class.

Known image processing programs for generating an instance segmentation mask either only provide a moderate quality or their adaptation to a current application requires a large amount of effort. For example, machine-learned models for instance segmentation are used that were learned using predetermined training data. The training data typically comprises a large number of microscope images (e.g., phase contrast images) and associated instance segmentation masks, whose creation requires manual effort on the part of an expert. Depending on the application, a new application can render necessary a new training, which in turn again requires a large amount of manual annotation effort. It would be desirable to be able to provide a high-quality instance segmentation model with less manual effort.

Annotation-free segmentation methods—e.g., image processing models learned by means of unsupervised training—are only able to provide a coarse division into a foreground and a background, not an instance segmentation, however.

A conventional machine-learned model for generating instance segmentation masks is described, for example, in:

Uwe Schmidt et al, "Cell Detection with Star-convex Polygons", arXiv:1806.03535v2 [cs.CV], 8 Nov. 2018

An example of an image analysis of a microscope image is confluence estimation: confluence is understood as the coverage of an area captured by the microscope image by biological cells. A confluence can be determined, for example, by simple segmentation models which output a binary mask in which one of the pixel values indicates the area covered by cells. Confluence can also be estimated from contours of a fluorescence image. Machine-learned models with convolutional neural nets or networks are often used. Confluence estimation can be carried out relatively easily and precisely compared to known approaches to instance segmentation.

Further image processing methods are cited here for the sake of completeness: Methods for counting biological cells in a microscope image, wherein in particular detection models are used or a density estimation is carried out, are known, cf.:

Weidi Xie, J. Alison Noble & Andrew Zisserman (2018) "Microscopy cell counting and detection with fully convolutional regression networks", Computer Methods in Biomechanics and Biomedical Engineering: Imaging & Visualization, 6:3, 283-292, DOI: 10.1080/21681163.2016.1149104

This facilitates a relatively easy and reliable determination of the positions of cell centers.

A machine-learned model for counting cells in a microscope image is described in:

Joseph Paul Cohen et al, "Count-ception: Counting by Fully Convolutional Redundant Counting", arXiv:1703.08710 [cs.CV], 23.07.2017

An object count is determined for each image section or patch by means of an FCN (fully convolutional network) so that a total count of the objects present in the image can subsequently be determined by averaging the counts of overlapping image sections.

Voronoi diagrams will be discussed as further background of the present disclosure. Mathematical concepts for calculating a Voronoi diagram are described in:

Ngoc-Minh Lê, "Randomized Incremental Construction of Simple Abstract Voronoi Diagrams in 3-space", Informatik-Berichte 174-03/1995, FernUniversität in Hagen In a Voronoi diagram, an area, e.g. a 2D image, is partitioned into regions as a function of predetermined points (Voronoi sites or seeds). Each region extends around one of the Voronoi sites. A pixel of the 2D image is assigned to the region whose Voronoi site is closest. Boundaries between Voronoi regions can accordingly be defined by their having the same distance to two neighboring Voronoi sites.

SUMMARY OF THE DISCLOSURE

It can be considered an object of the invention to indicate a microscopy system and a method which can capture and analyze objects that are to be analyzed in a particularly reliable and largely automated manner.

This object is achieved by means of the computer-implemented method and the microscopy system of the invention.

A computer-implemented method according to the invention for the instance segmentation of at least one microscope image showing a plurality of objects comprises at least the following processes: Positions of object centers of the objects in the microscope image are calculated. It is determined which image areas of the microscope image are covered by the objects. Voronoi regions are calculated using the object centers as Voronoi sites. An instance segmentation mask is determined by separating the image areas covered with the objects into different instances according to or using boundaries of the Voronoi regions.

A computer program according to the invention comprises commands that, when the program is executed by a computer, cause the execution of the method according to the invention.

A microscopy system according to the invention comprises a microscope for image capture and a computing device which is configured to carry out the computer-implemented method according to the invention. The microscope can in particular be designed to capture a microscope image or raw data with which a microscope image is calculated. The computing device can in particular be configured to: determine positions of object centers of objects in the microscope image; determine which image areas of the microscope image are covered by the objects; calculate Voronoi regions using the object centers as Voronoi sites; and determine an instance segmentation mask by separating the image areas covered with the objects into different instances according to or using boundaries of the Voronoi regions.

The objects can in particular be biological cells or cell parts. In this example, the object centers are cell centers, i.e., centers of cell parts or cell organelles. The area covered by cells or objects can also be called confluence. The confluence thus shows a size and position of the part of the microscope image that is covered by cells. With known image processing methods, object centers can be determined relatively reliably with moderate effort. The determination of the image areas covered by objects can also be carried out relatively robustly and precisely, e.g., in the form of a binary segmentation mask. These two approaches are combined with a Voronoi partitioning in order to generate an instance segmentation mask. The instance segmentation mask can thus be determined with essentially the same robustness and the same moderate effort as the object centers and a binary segmentation mask. Compared to known methods for instance segmentation, this generally necessitates less effort while simultaneously yielding a higher precision and reliability.

It is thus possible to generate an instance segmentation mask without training a special instance segmentation model to this end. This can significantly reduce a required annotation and training effort.

For many applications, it is no longer necessary to utilize a separate instance segmentation model, which can be advantageous in terms of speed.

Optional Embodiments

Variants of the microscopy system according to the invention and of the method according to the invention are the object of the dependent claims and are explained in the following description.

Voronoi Regions

The object centers are used as Voronoi sites in order to calculate a Voronoi partition. This divides an area, the size of which can be set so as to be, e.g., equal to the size of the microscope image, into different regions. Each of these regions, called Voronoi regions in the following, surrounds one of the object centers. Boundaries of the Voronoi regions can be calculated such that each boundary has the same distance to its neighboring object centers. In other words, an image pixel is assigned to the Voronoi region in relation to the object center of which the image pixel has the smallest distance. Corners of the boundaries have an equal distance to three or more object centers, boundaries otherwise running on the pixels to which two object centers have the same smallest distance.

In some embodiments of the invention, the distance is calculated as a Euclidean distance. The Euclidean distance corresponds, e.g., to the path length in the microscope image in pixels. The path lengths from one pixel of the boundary of the Voronoi region to the respective pixels of the two nearest object centers are thus the same.

Alternatively, it is also possible to define another metric by means of which the distance is determined. The boundaries of the Voronoi regions are still calculated such that each boundary has the same distance to its neighboring object centers or two nearest object centers with the difference that the distance is determined according to the defined metric. The metric can in particular be determined as a function of pixel values of the at least one microscope image. A path length between two pixels at a distance from one another can thus be weighted as a function of pixel values or grey values of all pixels lying on said path. Bright pixels can indicate a cell wall of a biological cell. As a result, bright pixels or high grey values can be weighted more heavily than lower grey values. A heavier weighting increases the calculated distance. A pixel can thereby be assigned to the Voronoi region of a first cell center to which said pixel has a greater Euclidean distance than to another, second cell center if fewer bright image areas (which indicate a cell wall) lie between that pixel and the first cell center.

In particular in the case of phase contrast images, it is also possible to provide a metric by means of which both particularly bright as well as particularly dark pixels are weighted more heavily than grey/medium-bright pixels. Grey pixels are mostly present outside cells as well as inside cells while both particularly bright and particularly dark pixels are found at cell walls. The defined metric thus assigns a distance to neighboring pixels that depends on the pixel values, wherein the weighting or calculated distance decreases in proportion to a pixel value increase in a lower value range and increases in proportion to a pixel value increase in a higher value range.

The metric can also weight a difference in brightness between neighboring pixels. The greater the difference in brightness between neighboring pixels, the greater (according to the defined metric) is the distance that is determined between these pixels. The shortest path between non-neighboring pixels in this metric runs on a curve with an in principle arbitrary curvature as a function of differences in brightness.

A metric to be used can also be determined by means of an image analysis of the microscope image. Object boundaries are mostly formed by a relatively small number of pixels while the majority of all pixels belongs to image areas within an object or to a background, i.e. to an image area outside the objects. As a result, it is possible to determine a predominant pixel value or average pixel value for which the metric stipulates a minimum weighting, i.e. a smallest contribution to the distance. As a rule, the predominant pixel value does not represent object boundaries. The more a pixel value deviates from the predominant or average pixel value, the higher the determined weighting of this pixel in the distance calculation. Optionally, the metric can define a higher weighting solely for pixel values that are brighter than the predominant/average pixel value or solely for pixel values that are darker than the predominant/average pixel value.

It is also possible to evaluate a confluence image in order to define the metric. In a confluence image, at least some of the object edges are marked. It is thus possible to identify the brightness values of pixels of the microscope image that form the object edges visible in the confluence image. A statistical difference between these brightness values and the brightness values of the other pixels of the microscope image can then be determined. It is thereby possible to determine which brightness values are typical for object edges in this microscope image. The metric can assign a greater weight in the distance calculation to pixels with these brightness values.

Alternatively or additionally, the distance can be calculated as a shortest path weighted by structures in the microscope image. A path through structures is weighted more heavily and thus corresponds to a greater distance. Structures can be determined by image analysis, for example based on pixel value variations in a plurality of adjacent pixels. If a plurality of adjacent pixels only exhibit minor differences in their pixel values, there is probably no structure present here or the pixels belong to the same object. In cases of more significant pixel value variations among a plurality of adjacent pixels, on the other hand, it is likely that an object or an object boundary is present. A path through these pixels is assigned a greater distance. Whether a pixel is assigned to a Voronoi region is thus also determined as a function of whether structures are present in the microscope image between this pixel and the Voronoi site of said Voronoi region.

If the distance is calculated as a shortest path weighted by structures in the microscope image, the objects can in particular be biological cells while the structures can be cell walls. By means of the weighting, a path through cell walls represents a greater distance than a path of an identical length in pixels that runs exclusively inside a cell or exclusively outside the cells.

The optimization of the Voronoi regions can occur, e.g., with the Dijkstra algorithm, which calculates a shortest path of a pixel to a starting point (a Voronoi site/object center). In principle, the calculation of the Voronoi regions using the object centers can generally be carried out by means of any algorithm designed for this purpose. It is in particular possible to use any calculation method by means of which the object center closest to each pixel is ultimately assigned to said pixel in the microscope image. For example, a Voronoi partition can be calculated as a dual problem via the determination of the Delaunay triangulation. In a basic implementation, it is also possible to determine straight lines that connect the object centers. A perpendicular is calculated in the middle of each connecting straight line. These perpendiculars form the boundaries of the Voronoi regions. Intersections of the perpendiculars form the corners of the Voronoi regions. In principle, it is also possible to employ methods for calculating so-called abstract Voronoi regions, as mentioned in the introductory discussion of the prior art.

Microscope Images

A microscope image can be understood as an image that is captured by a microscope or calculated by means of measurement data of a microscope. In particular, the microscope image can be formed by one or more raw images or already processed images of the microscope. The microscope image can also be calculated from measurement data of an overview camera on the microscope. If the microscope is a light microscope, the microscope image can also be a sample image captured by a sample camera which is provided in addition to the overview camera and which captures an image with a higher magnification than the overview camera. Microscope images can also be generated by other types of microscopes, for example by electron microscopes or atomic force microscopes. In some variants of the invention, the instance segmentation masks calculated from microscope images are used as training data; in particular in these cases, it is also possible for simulated or artificially generated images that were not captured by a microscope to serve as microscope images.

The object centers and the image areas covered by objects can be determined from the same microscope image. The calculation of positions of object centers of the objects in the microscope image can thus occur by means of an evaluation of precisely this microscope image. Alternatively, it is also possible that the positions in the microscope image are calculated using other measurement information, for example by means of at least one other microscope image that is registered spatially in relation to the cited microscope image. By two registered images it is understood that a spatial relationship between pixels of these images is known. If the position of an object center has been determined in a microscope image, the corresponding position of this object center in a registered microscope image is thus also known.

If the object centers and the image areas covered by objects are determined from different microscope images, the different microscope images can in particular be registered and have been captured with different microscopy techniques or microscope settings. Different microscopy techniques or contrast methods can include, e.g., fluorescence, bright-field or phase contrast imaging. By way of example, cell centers can come from a DAPI channel (i.e., from a fluorescence image in which the fluorescent stain DAPI is excited) while the confluence or image areas covered by objects are determined from a bright-field or phase contrast image. Different microscopy techniques can also indicate different fluorescence wavelengths. For example, it is possible to estimate the confluence from a different wavelength with a different dye (e.g., green fluorescent protein or GFP).

Objects Displayed in the Microscope Image

The objects displayed in the microscope image can differ depending on the sample type. For example, the objects can be biological cells, cell parts or cell organelles. In particular, a microscope image can show a section of tissue or pathology data. The objects can also be particles, or material samples, foams, pigments, pollen, electronic components or sections through glass and/or carbon fibers. In particular in the case of microscope images of an electron microscope, the objects can also be molecules or atoms. Objects that have a regular shape in the microscope image—e.g., are roundish, circular or approximately square—are particularly suitable for instance segmentation via Voronoi regions. The shape here is a shape in cross-section or in a top view or transparent view. It can also be advantageous if the objects have a similar diameter so that, e.g., all objects or at least 90% of all objects have a diameter that deviates by at most 50% from an average diameter of the objects.

Object Centers and Image Areas Covered by the Objects

The object centers and the image areas covered by the objects can be determined for a microscope image in an essentially known manner, in particular as described in the introductory discussion of the prior art. The centers of objects can be determined, for example, by means of a density estimation. Image areas covered by objects can be understood as all pixels of the microscope image which show a point of one of the objects. A confluence image indicating the image areas covered by the objects can be determined, e.g., as a (binary) segmentation mask by a segmentation model. Such a segmentation model receives the microscope image as input and can be learned in advance using training data. The determination of the confluence image and object centers can be performed by models that were learned separately or by a common model. It is also possible to use, among other things, heuristics for the confluence determination, e.g., a comparison of threshold values for segmentation or a detection of contours, in particular in cases where a DAPI channel is used. In the case of machine-learned models, it is possible to use, for example, a fully convolutional network for binary segmentation, optionally with a U-Net architecture.

Typical operations in the analysis of biological cells as objects include counting cells and determining a confluence. A potential method for counting cells is based on finding the cell centers. If this method is used, the already known steps for finding the cell centers and for determining a confluence can be utilized by the invention and render possible the calculation of an instance segmentation mask via the Voronoi regions. Additional machine-learned models or an additional manual effort on the part of a user is not necessary.

Confidence Map

A confidence map can be calculated for the instance segmentation mask, the confidence map indicating a confidence for each pixel or instance of the instance segmentation mask. The confidence map can be calculated as a function of distances of the respective pixels from neighboring object centers. As described in the foregoing, the distances can be calculated as Euclidean distances or according to some other metric.

For example, as the distance of a pixel from the nearest neighboring object center (or from the nearest neighboring object centers) decreases, the confidence indicated by the confidence map for that pixel increases. The confidence that an assigned pixel belongs to the object to which it has been assigned accordingly increases in proportion to the proximity of said pixel to the center of that object.

Alternatively or additionally, the confidence map can indicate a confidence for a pixel that increases in proportion to a magnitude of a difference between a distance of the pixel from the nearest object center and a distance of said pixel from a second nearest object center. The probability that a pixel belongs to an instance of an object is thus particularly high when the distance to the center of said object is significantly smaller than the distance to the center of the second nearest object. If a pixel is located at approximately equal distances from the centers of two (or more) objects, on the other hand, the confidence map indicates a low confidence level for the instance assignment of this pixel.

If the confidence map indicates a confidence per instance, then a single confidence level (a single value) is indicated in the confidence map for each instance, i.e. one value for each area identified in the instance segmentation mask as an object. A confidence for an instance can be calculated, for example, as an aggregation, in particular as a sum or mean, of the pixel values of the confidence map within the area of said instance.

Instead of or in addition to a confidence map, it is also possible for a single confidence value to be calculated for the instance segmentation mask. The confidence value can be calculated, e.g., as an aggregation, in particular as a sum or mean, of the pixel values of the confidence map.

Variations in the Separation of Covered Image Areas According to Voronoi Regions The image areas covered by objects are separated according to or using boundaries of the Voronoi regions in order to describe different instances of the objects. In this separation of the covered image areas, additional variations or corrections can occur depending on how the boundaries of the Voronoi regions run in relation to edges of the covered image areas.

Cases can occur where, in a separation of the covered image areas according to the boundaries of the Voronoi regions, one of the Voronoi regions would engender two separate instances, i.e. two separate regions covered by objects. In this case, there can occur a correction in which a smaller of the two separate regions is discarded (i.e., is evaluated as background and not as an instance of an object). Alternatively, the smaller of the two separate regions can be assigned to one or more neighboring Voronoi regions. This prevents a single Voronoi region from engendering two different object instances.

Suitability of the Microscope Images

Optionally, it is possible to first evaluate whether the sample is suitable for calculating an instance segmentation mask via Voronoi regions. This may not be the case if the sample includes objects (for example cells) that have a highly elliptical or concave shape in the microscope image.

A suitability of the objects for determining an instance segmentation mask via Voronoi regions can be ascertained by evaluating the microscope image. For example, shapes of at least some of the objects in the microscope image can be determined. Displayed objects generally have a shortest dimension (diameter) in one direction and a maximum dimension in another direction. Suitability can be evaluated, for example, as a function of the ratio of the shortest dimension to the maximum dimension. Suitability is denied if the ratio is lower than a predetermined threshold, wherein the threshold can lie, e.g., between 0.1 and 0.35.

Alternatively, the suitability of the objects can be established via an identification of the objects, it being stored for various object types whether said objects are suitable for the cited use. The identification of the objects can occur using the microscope image or independently of the microscope image by means of some other data source or data input.

Only in the event of a suitability of the objects are Voronoi regions calculated and an instance segmentation mask determined based on the latter. This ensures that an instance segmentation mask is only calculated when this is possible with foreseeably high accuracy.

Using the Instance Segmentation Mask

Based on the instance segmentation mask obtained in the manner disclosed in the present application, it is possible to implement various applications that would not be possible merely with a knowledge of the object centers and the confluence or image areas covered by the objects. In the following applications, the objects can be biological cells, although this is not mandatory. The instance segmentation mask can be used for an object analysis in one or more of the following manners:

Image sections of the microscope image that contain objects can be cut out with pixel precision by means of the instance segmentation mask. These image sections are fed to a subsequent model (as patches) for object analysis, for example in order to classify the cell cycle status in cases of biological cells as objects. This has the advantage that no image areas of a surrounding area or of another object are input into the subsequent model. The subsequent model can be a machine-learned model, e.g., a model for classification, regression or an image-to-image mapping. Instead of a subsequent machine-learned model, it is also possible to use a subsequent algorithm that is not machine-learned.

Alternatively or additionally, it is possible to determine object sizes from the instance segmentation mask. For example, cell size statistics can be determined from the instance segmentation mask for biological cells, in particular with respect to an area or a circumference of cells. Variations in cell sizes can be indicative of a certain state or serve to discriminate different cell types. Knowing cell sizes also facilitates a resizing of an image so that cells have a desired size in pixels, e.g., an average diameter of 10 pixels. In this case, a subsequent model, e.g. for classifying a cell cycle status, merely requires training images showing cells with a size of approx. 10 pixels in order to be learned, which simplifies the training significantly.

Instance segmentation masks further allow objects to be tracked spatially over a time series. To this end, an instance segmentation mask is calculated in the described manner using a plurality of microscope images captured in succession.

It is also possible to calculate morphological features of objects from the instance segmentation mask. Objects can then optionally be filtered as a function of the morphological features. For example, biological cells can be filtered out if they are circular so that only cells of some other type remain.

Additionally or alternatively, the instance segmentation mask can be used for an interactive verification of data annotations. Annotations can be required, e.g., in order to train a model and should be checked by a human expert before the training. An annotation of cell centers is much easier for a human expert to check with, for example, colored instance segmentation masks than with a representation of cell centers, which are relatively easily overlooked. The instance segmentation mask or a mask derived from the same, in particular a colored representation of the instance segmentation mask, can thus be displayed to a human for the verification of object centers. In the event of a coloring, different instances of the objects are colored differently so that in particular neighboring objects are given different colors. It is also possible to display a superimposition of the instance segmentation mask with the cell centers and/or the associated microscope image.

The instance segmentation mask also renders possible a quality control of an object center estimation or confluence estimation. The instance segmentation mask is used to determine errors in the calculated positions of object centers and/or the image areas covered by objects, wherein an error is inferred as a function of an extent to which a size and/or shape of an instance (i.e., of a region of an object) in the instance segmentation mask deviates from an average size or shape of the instances in the instance segmentation mask. This error detection is particularly suitable when a microscope image shows objects of an identical type which should exhibit essentially the same shape and/or size.

Respective instance segmentation masks can be calculated for a plurality of microscope images in the described manner. The instance segmentation masks can optionally be used as an additional training signal in the training of a model. In this variant, in addition to its intrinsic task, the model also predicts an instance segmentation mask, wherein a deviation between the predicted instance segmentation mask and the predetermined instance segmentation mask is entered into the objective function to be optimized as an auxiliary loss. The model can be designed as a neural network in which, after an initial processing section (backbone), a processing splits into two or more paths (heads), of which one processes the intrinsic task of the model and the other path generates the instance segmentation mask. In this manner, the training for an instance segmentation also contributes to the determination of the model parameters of the backbone and thereby has a stabilizing and quality-enhancing effect on the intrinsic task of the model. The intrinsic task can be, e.g., a counting of objects/cells (cell counting model) and/or a confluence determination (confluence determination model). It is also possible to provide a common model for both an object counting as well as a confluence determination. Such a common model can be designed, e.g., as a multi-head model in which there is a common backbone (first data processing part of the model) while different heads (different second data processing parts of the model) are provided for the object counting and confluence determination. The model can also be re-trained using the instance segmentation masks, wherein a previous version of the model trained in particular without predetermined instance segmentation masks was used to determine the object centers and/or the image areas covered by objects. It is thus possible to first use a trained model to determine the object centers and/or the image areas covered by objects before instance segmentation masks are generated via the Voronoi regions and the generated instance segmentation masks are finally used for a new training of the model. The model should be able to predict object centers and/or image areas covered by objects with greater precision or reliability as a result.

The microscope image and the instance segmentation mask calculated with the same can also be used as training data for an instance segmentation model or a segmentation model. It can be assumed that any inaccuracies at the object edges/cell edges will average out with a sufficient amount of training data. The training data comprises a plurality of the microscope images as input data and the associated instance segmentation masks calculated via Voronoi regions as target data. A thus trained instance segmentation model can calculate instance segmentation masks where appropriate more efficiently or faster than is possible with the described approach via Voronoi regions. Compared to a conventional training of an instance segmentation model, annotation effort is significantly reduced. In particular, training data in the form of manually created/annotated instance segmentation masks is not required. If the object centers and the image areas covered by objects are calculated by machine-learned models, it is possible to generate training data with relatively little manual effort, as object centers and confluence images can be annotated or corrected manually much more readily than instance segmentation masks.

In a variation of the above embodiment, the instance segmentation masks calculated with microscope images are likewise used as training data for an instance segmentation model. The microscope images, however, are not used as input data in the training. Instead, other images registered spatially in relation to the microscope images are used as associated input data in the training. These other images can be captured by a microscope with a different contrast method or with different microscope settings than the microscope images. For example, the microscope images can be fluorescence images. In particular, cell nuclei can be rendered identifiable by means of the stain DAPI in fluorescence images, which makes it easy to determine cell centers. The cell centers from the DAPI staining are used to calculate the Voronoi regions and the instance segmentation masks. Other images registered in relation to the fluorescence images, e.g. bright-field/phase contrast images, can subsequently be used as input data in the training of an instance segmentation model, wherein the instance segmentation masks calculated via the DAPI staining that correspond to these images spatially are used as target images or ground truth in the training. The model learned in this manner is subsequently able to perform a precise instance segmentation of bright-field or phase contrast images, in which cells or cell centers are much more difficult to detect than in fluorescence images. An availability of microscope images and other images of another contrast method is thus a prerequisite for the generation of the training data; in contrast, the instance segmentation model in the inference phase (upon completion of the training) does not require microscope images but only images of the other contrast method in order to generate instance segmentation masks.

Optionally, it is possible to supplement an instance segmentation model described in the foregoing with a plausibility check: To this end, a correspondence of an instance segmentation mask calculated by the instance segmentation model with an object count and/or confluence is determined. The object count and/or confluence can occur, e.g., by means of machine-learned models or by means of a common machine-learned model that was also used for the original calculation of instance segmentation masks via Voronoi regions. The number of instances of objects in the instance segmentation mask should correspond to the object count. The total area of all object instances in the instance segmentation mask should also correspond to the calculated confluence.

In the aforementioned training of an instance segmentation model, a cyclical application of the training in the sense of a bootstrapping is also possible. The inventive steps for determining an instance segmentation mask by means of Voronoi regions are repeated in this case, but using the instance segmentation model. The instance segmentation model thus calculates a new instance segmentation mask from the microscope image, wherein new positions of object centers (=centers of the segments) and/or new image areas covered by objects (=area of all instances) are determined based on the new instance segmentation mask. If new positions of object centers are determined, then new Voronoi regions are calculated with the same and an updated instance segmentation mask is calculated using the newly calculated Voronoi regions. If new image areas covered by objects are determined, then they serve as the basis for the sectioning by means of the Voronoi regions, which yields an updated instance segmentation mask. This procedure can be repeated as often as desired, whereby a continuously improving instance segmentation model is learned. The alternating improvement of the instance segmentation model and improved calculation of Voronoi regions follows the expectation-maximization paradigm.

For a first-time determination of the object centers and the area covered by the objects, a cell center and confluence determination model can be trained with initial data. In a variant of the aforementioned embodiment, it is possible to obtain training data for this object center and confluence determination model from the microscope image and the instance segmentation mask calculated with the same, whereupon a new training of said model can take place.

It is also possible for bounding boxes to be generated from the instance segmentation mask. The microscope image and the associated bounding boxes can subsequently be used as training data for a detection model. Alternatively, it is possible to use the bounding boxes and an image which is registered in relation to the microscope image and which has been captured with a different contrast method or with different microscope settings than the microscope image as training data for a detection model. Examples of other contrast methods or microscope settings are cited above in relation to the training of an instance segmentation model.

General Features

A microscopy system denotes an apparatus which comprises at least one computing device and a microscope. A microscope can in particular be understood as a light microscope, an X-ray microscope, an electron microscope or a macroscope.

The computing device can be designed to be decentralized, to be physically part of the microscope or can be arranged separately in the vicinity of the microscope or at a location at an arbitrary distance from the microscope. It can generally be formed by any combination of electronics and software and comprise in particular a computer, a server, a cloud-based computing system or one or more microprocessors or graphics processors. The computing device can also be configured to control the sample camera, the overview camera, image capture and/or other microscope components.

Some method variants comprise the capture of at least one microscope image by the microscope while in other method variants an existing microscope image is loaded from a memory.

Descriptions in the singular are intended to cover the variants "exactly 1" as well as "at least one". The described use of a microscope image for the determination of object centers or a confluence image is intended to comprise, for example, the possibilities that exactly one or at least one microscope image is used. A plurality of microscope images of the same sample can be captured, e.g., with different brightnesses or contrast methods and subsequently evaluated together in order to obtain the object centers or a single confluence image. A common processing of a plurality of microscope images can also be advantageous when the microscope images constitute an image stack (z-stack) which shows sample layers at different heights.

The characteristics of the invention that have been described as additional apparatus features also yield, when implemented as intended, variants of the method according to the invention. Conversely, a microscopy system or in particular computing device can also be configured to carry out the described method variants. The computing device can also comprise the described computer program. While a ready-trained model is used in some variants, other variants of the invention result from the implementation of the corresponding training steps, and vice versa.

BRIEF DESCRIPTION OF THE DRAWINGS

A better understanding of the invention and various other features and advantages of the present invention will become readily apparent by the following description in connection with the schematic drawings, which are shown by way of example only, and not limitation, wherein like reference numerals may refer to alike or substantially alike components.

DETAILED DESCRIPTION OF EMBODIMENTS

Figure 1:
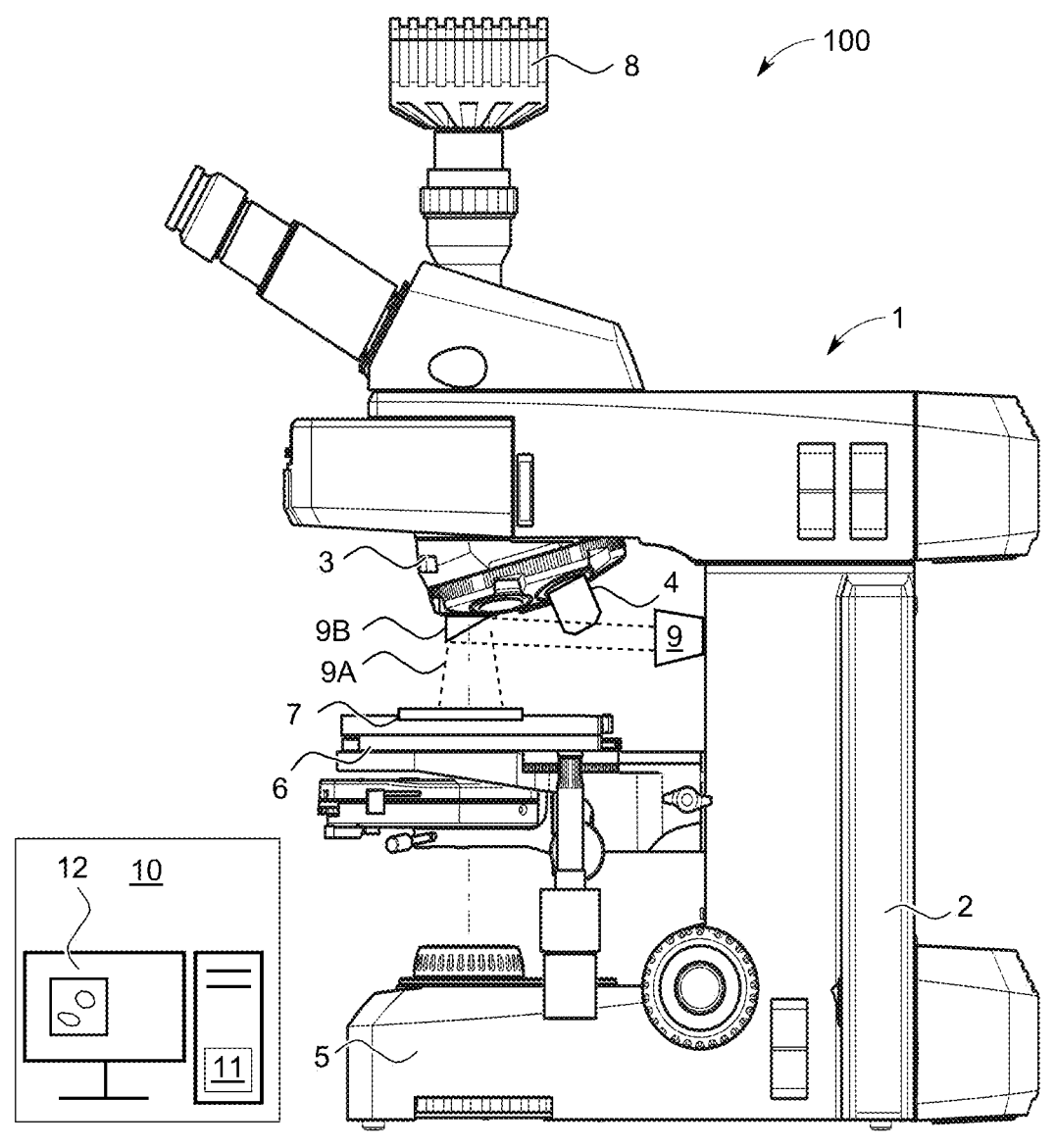
FIG. 1 is a schematic illustration of an example embodiment of a microscopy system according to the invention.

Different example embodiments are described in the following with reference to the figures.
FIG. 1

Figure 2:
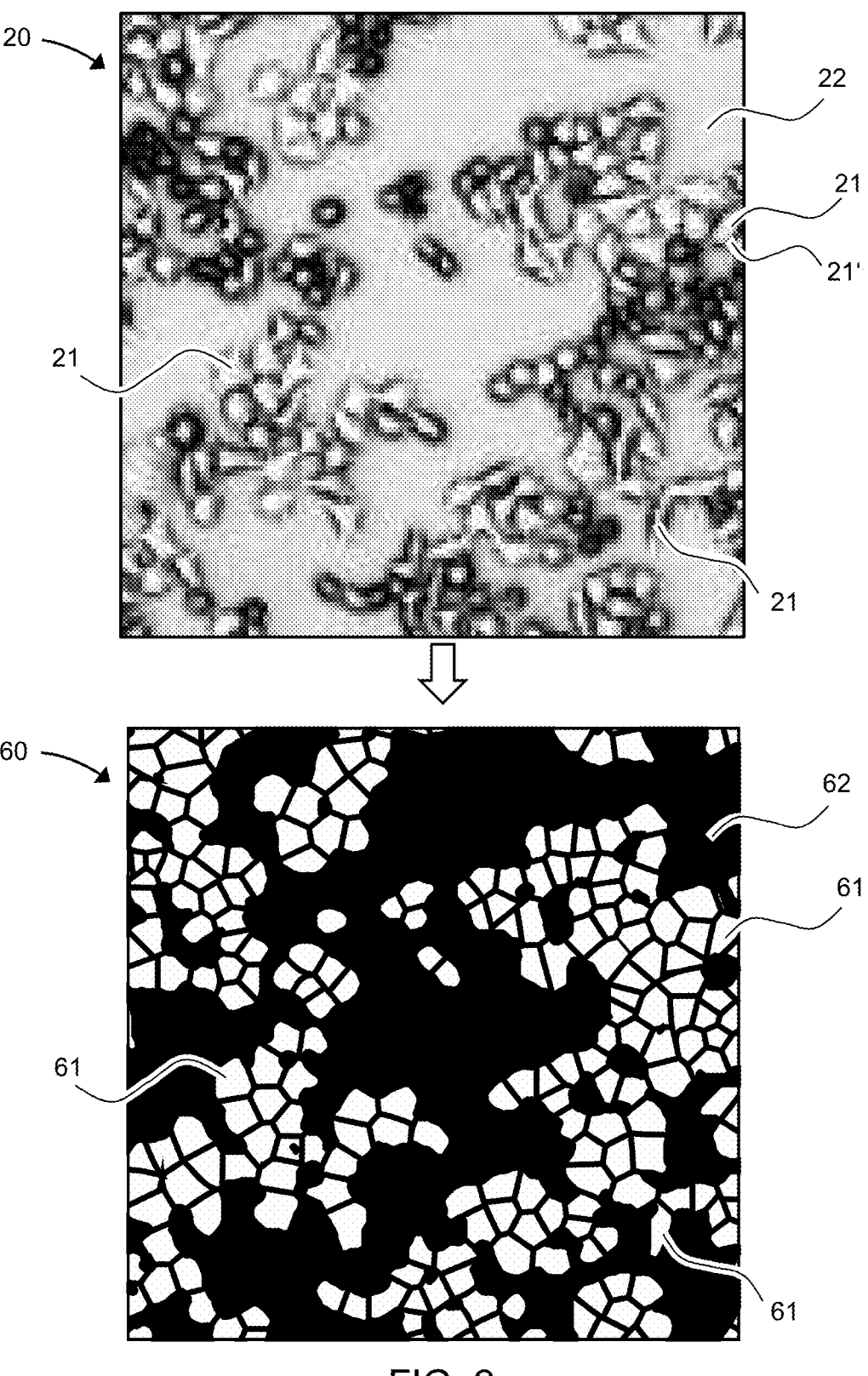
FIG. 2 schematically shows a microscope image and an associated instance segmentation mask.

FIG. 1 shows an example embodiment of a microscopy system 100 according to the invention. The microscopy system 100 comprises a computing device 10 and a microscope 1, which is a light microscope in the illustrated example, but which in principle can be any type of microscope. The microscope 1 comprises a stand 2 via which further microscope components are supported. The latter can include in particular: an illumination device 5; an objective changer/revolver 3, on which an objective 4 is mounted in the illustrated example; a sample stage 6 with a holding frame for holding a sample carrier 7; and a microscope camera 8. When the objective 4 is pivoted into the light path of the microscope, the microscope camera 8 receives detection light from a sample area in which a sample can be located in order to capture a microscope image. In principle, a sample can be or comprise any object, fluid or structure. The microscope 1 optionally comprises an additional overview camera 9 for capturing an overview image of a sample environment. The overview image can thus show in particular the sample carrier 7 or a part of the same. A field of view 9A of the overview camera 9 is larger than a field of view when a sample image is captured. In the illustrated example, the overview camera 9 views the sample carrier 7 via a mirror 9B. The mirror 9B is arranged on the objective revolver 3 and can be selected instead of the objective 4. In variants of this embodiment, the mirror is omitted or a different arrangement of the mirror or some other deflecting element is provided. The computing device 10 comprises an optional touchscreen 12 and a computer program 11 for processing at least one microscope image, i.e. a sample image or overview image. This is discussed in greater detail in the following with reference to FIG. 2.
FIG. 2

FIG. 2 schematically shows a microscope image 20, which in this example is a phase contrast image. For the purposes of a better illustration, the brightness of a typical phase contrast image is inverted in FIG. 2, i.e. black and white have been switched, which is not necessary in practical implementations of the invention. The microscope image 20 shows a plurality of objects 21, which in this case are biological cells 21'. The cells 21' partially touch each other and thus form several contiguous regions in which the cells 21' fit together without any gaps. A part of the area captured by the microscope image 20 is not covered by cells and is referred to as background 22 in the following. The area of the microscope image 20 covered by the cells 21' or more generally by the objects 21 is also referred to as a confluence.

The invention is in particular intended to permit the calculation of an instance segmentation mask 60 from the microscope image 20, as schematically illustrated in FIG. 2. An instance segmentation mask is characterized by the fact that the locations of different objects of the associated microscope image are marked so that the different objects, also called instances, are discriminated. An image area covered by a plurality of objects 21 without gaps is thus not represented in the instance segmentation mask 60 as a single region or a single object, but rather instances 61 of objects are represented separately from one another. An instance 61 is understood as one of the objects, i.e. as the image area of one of the objects 21. In the example shown, the instances 61 or image areas covered by objects 21 are depicted in white while a background 62 is depicted in black. In practical implementations, a representation of a calculated instance segmentation mask 60 does not necessarily have to occur and, in the event of a representation, the form of representation is arbitrary so long as the instances 6 of objects are discriminable. To this end, for example, the instances 61 can be represented by different colors so that it is not necessary to have gaps between touching objects 21 or instances 61 in the representation of the instance segmentation mask 60. An instance 61 and the background 62 are typically respectively indicated by a uniform pixel value in the instance segmentation mask 60.

The area of the background 62 of the instance segmentation mask 60 corresponds spatially to the background 22 of the microscope image 20. The locations and areas of the instances 61 likewise correspond with high precision to the locations and areas of the objects 21 in the microscope image 20.

Figure 3:
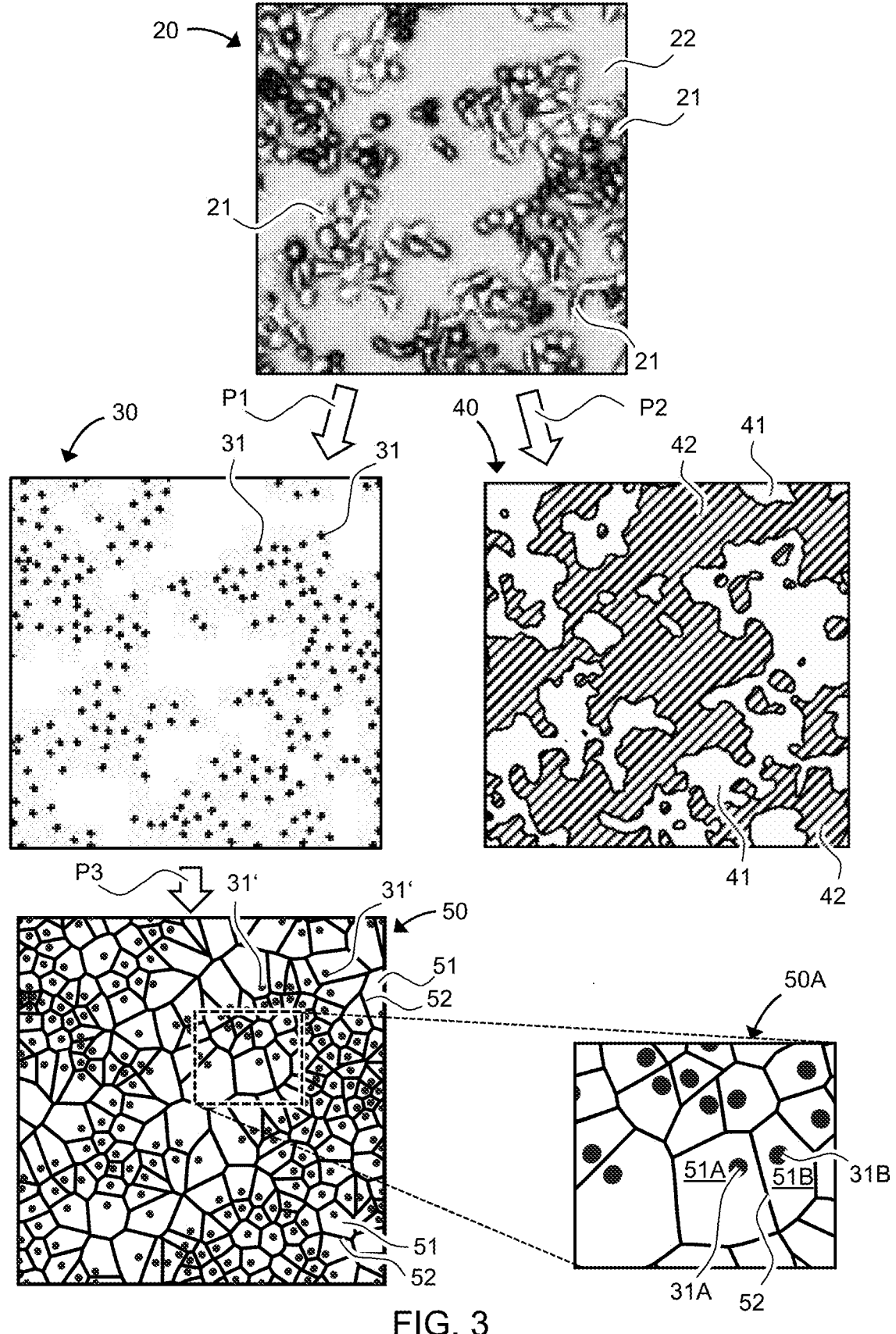
FIG. 3 schematically shows a process sequence for generating a Voronoi partition according to example embodiments of the invention.

The processes provided for generating the instance segmentation mask 60 from the microscope image 20 according to different variants of the invention are described in the following with reference to FIG. 3 and FIG. 4.
FIG. 3

FIG. 3 shows processes of an example embodiment of a computer-implemented method according to the invention. The method can be implemented by the computer program 11 of FIG. 1; analogously, the computing device 10 of FIG. 1 can be configured to carry out this method.

FIG. 3 first shows the microscope image 20 from which positions of object centers 31 of the objects 21 in the microscope image 20 are calculated in a process P1. FIG. 3 further schematically shows a resulting object center image 30 in which the object centers 31 are plotted. The positions of the object centers 31 in the object center image 30 ideally correspond to actual positions of the object centers of the objects 21 in the microscope image 20. The process P1 can be carried out in an essentially known manner, for example via a density estimation or a machine-learned model. The position of the cell center in the microscope image is accordingly calculated for each cell 21'.

Also calculated from the microscope image 20 in the process P2 is a confluence image 40 which discriminates the image areas 41 covered by the objects 21 from a background 42. The confluence image 40 can take the form of a segmentation mask, in particular a binary segmentation mask, in which one pixel value indicates that the corresponding pixel belongs to the background 42 and another pixel value indicates that the corresponding pixel belongs to the image areas 41 covered by objects 21. If the calculation is correct, the area of the background 42 in the confluence image 40 corresponds spatially to the area of the background 22 of the microscope image 20. The covered image areas 41 should correspond precisely to the total area of all objects 21 in the microscope image 20. A discrimination of objects 21 that touch each other without any gaps does not occur in the confluence image 40. A quantity of objects 21 or dividing lines between such touching objects 21 is thus not discernible in the confluence image 40. The process P2 for calculating the confluence image can be performed in an essentially known manner, e.g., by machine-learned segmentation models, by algorithms for determining contiguous regions (connected component analysis), or by means of simple threshold value comparisons for the grey values of the microscope image 20.

The positions of the object centers 31 and a confluence image 40 can be generated with relatively high precision and reliability, in particular even in the event of larger differences between potential microscope images 20. A display of the object center image 30 and confluence image 40 is not necessary in practical implementations of the invention.

In order to generate an instance segmentation mask, in various variants of the invention, the object centers 31 are used in a process P3 to calculate a Voronoi partition (Voronoi diagram) 50. The Voronoi diagram 50 is an image divided into different regions (Voronoi regions 51). Each Voronoi region 51 surrounds a point (Voronoi site 31'), which are precisely the object centers 31. The positions of the object centers 31 are thus used as sites 31' for the calculation of Voronoi regions 51. The specific calculation method used is secondary and in principle it is possible for known calculation methods to be employed such as a Delaunay triangulation. In the Voronoi partition 50, each region 51 is determined by exactly one site 31' and comprises all points of the image that are closer to the site 31' of the region 51 than to any other site in terms of a metric, in the illustrated example in terms of the Euclidean metric.

In FIG. 3, a section 50A of the Voronoi partition 50 is shown in an enlargement for the purposes of illustration. Two Voronoi regions 51A and 51B are separated by a boundary 52. A pixel on a boundary 52 has the same distance to two neighboring Voronoi sites or object centers 31A and 31B. A pixel within the Voronoi region 51A, on the other hand, always has the shortest distance to the object center 31A of said Voronoi region 51A while the distance to all other object centers is higher. A pixel on a corner of the boundary 52 exhibits the same distance to at least three Voronoi sites.

FIG. 3 shows the Voronoi partition 50 together with the Voronoi sites 31', i.e. in the form of a superimposition with the object center image 30, for the purposes of illustration. The representation according to FIG. 3 is not mandatory, however, as only the Voronoi regions 51 or their boundaries 52 are necessary for the calculation of an instance segmentation mask according to different variants of the invention. The subsequent steps for generating an instance segmentation mask are described with reference to FIG. 4.

FIG. 4

Figure 4:
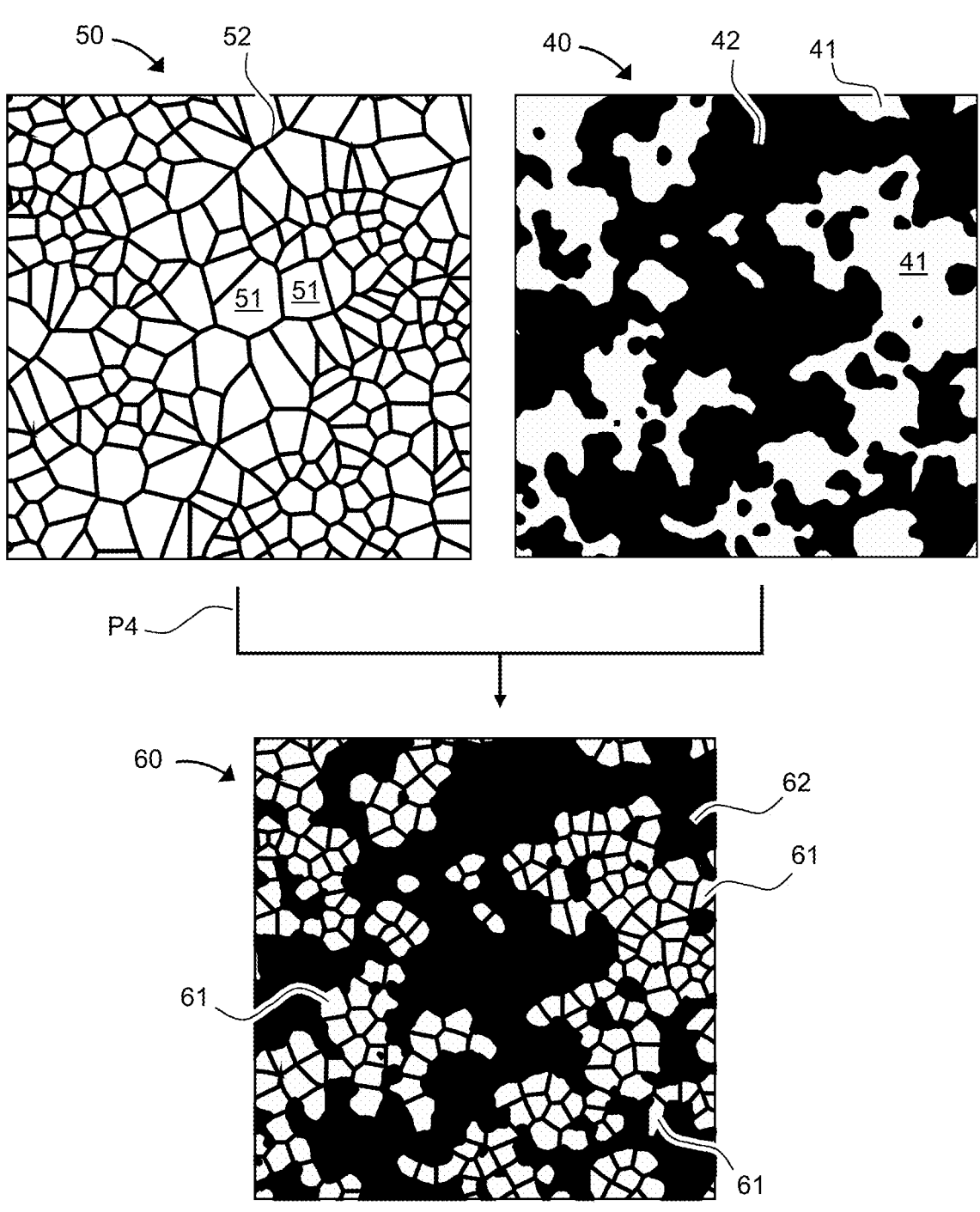
FIG. 4 schematically shows processes for generating an instance segmentation mask by means of a Voronoi partition according to example embodiments of the invention.

FIG. 4 shows the Voronoi partition 50 of FIG. 3 and the confluence image 40 of FIG. 3. In contrast to FIG. 3, in which the background in the confluence image 40 is depicted as a hatched area, the background is represented in black in FIG. 4. In concrete implementations, a mode of representation can be arbitrary.

In a process P4, a calculation is performed using the Voronoi partition 50 and the confluence image 40 in order to form an instance segmentation mask 60. In the instance segmentation mask 60, a background 62 is formed by the background 42 of the confluence image 40. The image areas 41 of the confluence image covered by objects are sectioned or subdivided according to the boundaries 52 of the Voronoi regions so that one of the image areas 41 covered by objects is separated into a plurality of instances 61 of objects. The number of instances 61 corresponds to the number of objects 21, i.e. to the number of determined object centers 31. In order to calculate the instance segmentation mask 60, e.g., the Voronoi partition 50 and the confluence image 40 can be superimposed.

An instance segmentation mask 60 can be calculated with precision in the described manner without the need for a machine-learned model trained specially for this purpose. In particular, it is thereby possible to omit laborious manual annotations, i.e. instance segmentation masks that are partially generated manually for a training of a model. This renders possible a robust instance segmentation with relatively little manual effort.

Variations of the described embodiments are explained in the following.

If an image area 41 covered by objects is sectioned by boundaries 52 of the Voronoi regions 51, as shown in FIG. 4, a verification and, where appropriate, correction of the sections can occur.

Depending on the shapes involved, it can occur that, by means of the sectioning of the image areas 41 covered by objects along the boundaries 52, a number of instances 61 is generated that is higher than the number of Voronoi regions 51. In such a case, a correction can occur by means of which the number of instances 61 is reduced to the number of Voronoi regions 51. If two instances 61 lie within the same Voronoi region 51, then one of the two instances 61, in particular the smaller of the two instances 61, can be deleted or merged with a neighboring instance.

There can also occur an adjustment of the edges of the instances 61, e.g. a smoothing of the edges or a rounding of corners, although rounding can create small gaps between the corners of neighboring instances 61. The shapes of the instances 61 can also be adjusted by means of an approximation of predetermined shapes; for example, if it is known that the objects 21 have an oval or circular shape, the shapes of the instances 61 can be adapted accordingly.

A variation of the described embodiment relates to the process P1 for calculating positions of object centers 31 of the objects 21 in the microscope image 20, cf. FIG. 3. In the case shown in FIG. 3, the object centers 31 and the confluence image 40 are calculated from the same microscope image 20. In a variation of this case, the object centers 31 and the confluence image 40 are calculated from two different microscope images. The two microscope images can differ, e.g., with respect to the contrast method; in particular, the two microscope images can be a phase contrast image and a fluorescence image, or two fluorescence images for which different excitation and/or detection wavelengths were used. The two microscope images are registered, i.e. their fields of view correspond or it is known how the images are shifted or transformed relative to each other so that the image coordinates of a sample point in one of the two microscope images can be converted to corresponding image coordinates in the other of the two microscope images.

FIG. 5 and FIG. 6

Figure 5:
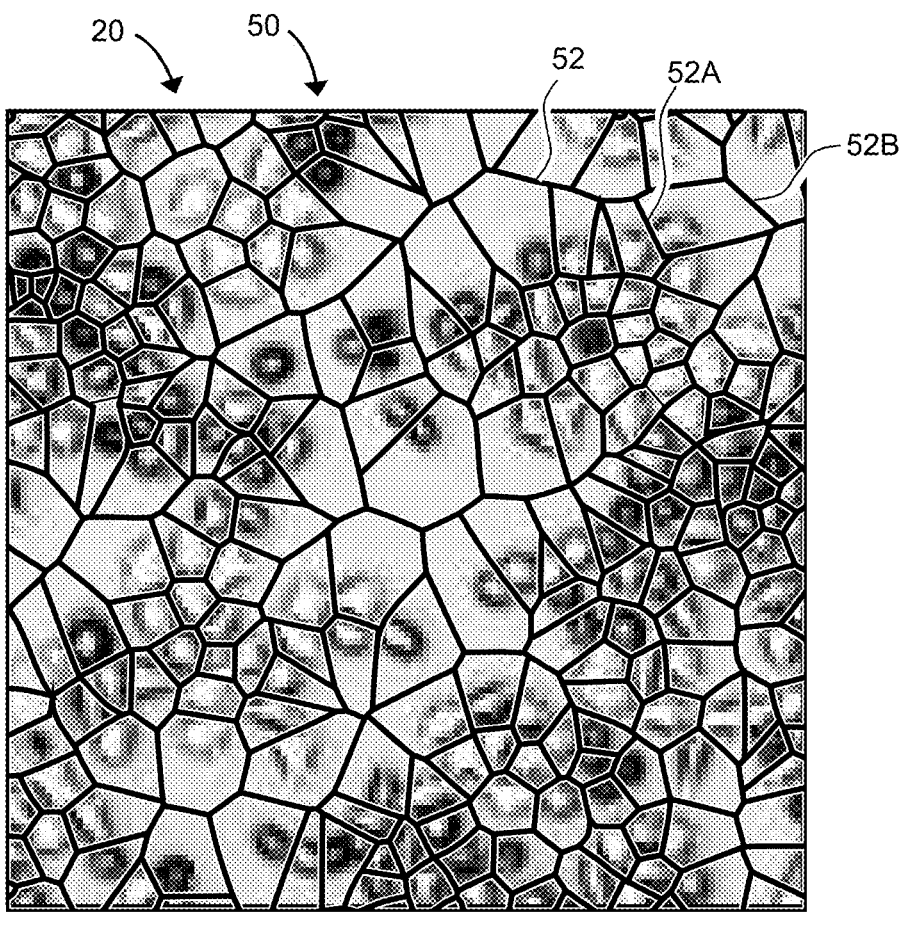
FIG. 5 schematically shows a superimposition of a microscope image 20 and an associated Voronoi partition 50.

A further variant of the described variant embodiments is described in the following with reference to FIG. 5 and FIG. 6. FIG. 5 shows a superimposition of the microscope image 20 and the corresponding Voronoi partition 50, which can be calculated using the approach described in the foregoing. As illustrated, there is a good correspondence between the boundaries 52 of the Voronoi regions and the object boundaries of touching objects 21 such as, e.g., at the boundary 52A. For boundaries of Voronoi regions between objects that do not touch such as, e.g., the boundary 52B, the exact position is not critical since such a boundary 52B lies outside the image regions 41 covered by objects and thus does not affect the shapes of the instances 61; such a boundary 52B rather merely runs within the background 62 of the corresponding instance segmentation mask 60.

With respect to the boundaries 52A between touching objects 21, on the other hand, a boundary progression that is correct ideally with pixel precision is desirable. A boundary 52 of a Voronoi region is usually defined by the characteristic that it has the same distance to the two nearest object centers. The distance is determined as a Euclidean distance in the illustrated variant. The Euclidean distance between two pixels of the microscope image 20 or an image calculated from the same is precisely the shortest distance (of a connecting straight line) between these pixels. However, it is also possible to use some other metric in order to determine the distance, which changes the progressions of the boundaries 52. For example, a metric can be used according to which the distance is calculated as the shortest path between two pixels, weighted by the respective pixel values on that path. The pixel values are taken from the microscope image 20. In phase contrast images, edges of objects 21 often appear as particularly bright and/or particularly dark pixels, while a background and often also the interior of an object 21 are rendered by means of grey pixels. A weighting of a path length can thus increase in proportion to the magnitude of a deviation of a pixel value upwards and/or downwards from a grey pixel value, i.e. towards white and/or black. This is described with reference to the example shown in FIG. 6.

Figure 6:
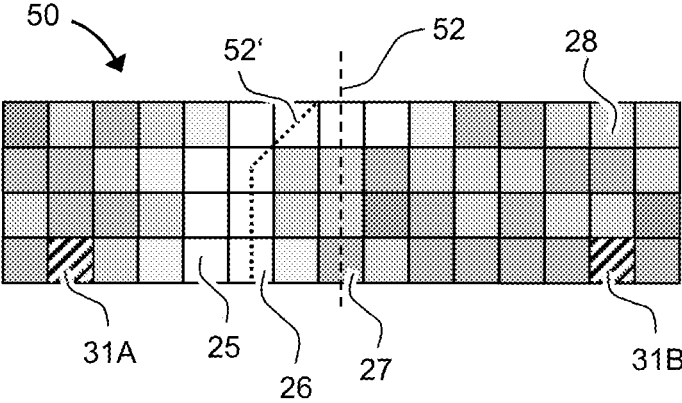
FIG. 6 schematically shows a section of a microscope image 20 with a boundary plotted between neighboring Voronoi regions.

FIG. 6 schematically shows a plurality of pixels, which can be a section of the microscope image 20. The reference signs 25 and 26 indicate by way of example two pixels that are brighter than the greyer pixels 27 and 28. The two pixels of two object centers 31A and 31B are depicted with a hatched pattern. A Voronoi region is formed around each object center 31A and 31B. A boundary between these Voronoi regions is formed in the case of a Euclidean metric by the boundary 52 illustrated as a dashed line. The pixels on this boundary have the same distance (measured in pixels) in relation to the object center 31A and the object center 31B. For example, the pixel 27, which lies on the boundary 52, has a distance of six pixels to the object center 31A and a distance of six pixels to the object center 31B. Alternatively, it is also possible to use a metric in which a pixel with a value towards a white pixel value is weighted more heavily, i.e. results in a greater distance, than a darker, grey pixel. A path over the brighter pixels 25 and 26 describes a greater distance in this metric than a path over the darker pixels 27 and 28. Such a metric produces the boundary 52'. The respective path lengths in pixels from the boundary 52' to the two object centers 31A and 31B are different—the distance in the applied metric, however, is the same. For example, the pixel 26, which lies on the boundary 52', has a path length of eight pixels to the object center 31B and a path length of only four pixels to the object center 31A. This metric increases the probability that boundaries 52' between Voronoi regions run along bright pixels, which are more likely to represent object edges. This metric also facilitates the achievement that two neighboring object centers 31A and 31B do not necessarily produce a straight line as the boundary of the Voronoi regions; instead, as illustrated, the boundary 52' can have a non-rectilinear progression. This enables a potentially improved rendering of natural object edges, e.g., cell walls.

Brightnesses of object edges can vary depending on the type of microscope image as well as the type of objects analyzed. Different metrics are accordingly possible which differ in the weights assigned to different brightness values for the distance calculation. In the illustrated example, a suitable metric assigns a weight to pixels that increases with increasing brightnesses. Conversely, if object edges are represented by particularly dark pixels, a suitable metric assigns a weight to pixels that increases with decreasing brightnesses. It is also possible for both particularly bright and particularly dark pixels within a microscope image to indicate object edges while medium-bright (grey) pixels predominate in other image areas. In this case, the metric can assign a high weight to black pixels in the distance calculation, wherein the weight initially decreases and then increases with increasing pixel brightness.

In the variants of the invention described with reference to FIG. 6, a boundary of the Voronoi regions runs on pixels, i.e. some pixels of the microscope image are assigned to the boundaries between Voronoi regions. Alternatively, the boundaries can also run between pixels so that each pixel is assigned to a Voronoi region and no pixel lies on the boundary.

In a further variation, a confidence map is additionally calculated, which indicates a confidence for each pixel of the instance segmentation mask 60. The confidence map is thus an image of the size of the instance segmentation mask 60, wherein each pixel value of the confidence map indicates a confidence level for the spatially corresponding pixel of the instance segmentation mask 60. A pixel value of the confidence map is calculated as a function of the distance of this pixel from the neighboring object center, i.e. the object center of the same Voronoi region. With reference to FIG. 6, the pixel 28, for example, is closer to the associated object center 31B than the pixel 27 so that the confidence map indicates a higher confidence for the position of the pixel 28 than for the position of the pixel 27. In a further variation, the confidence is not calculated simply as a function of the distance of a pixel, e.g. the pixel 28, from the nearest object center 31B. Instead, the confidence is calculated as a function of the magnitude of the difference between the distance of said pixel 28 from the next object center 31B and the distance of said pixel 28 from the second nearest object center 31A. A pixel can thereby be assigned a high confidence even in cases where it has a large distance to the nearest object center when the second nearest object center is considerably further away.

FIG. 7

Figure 7:
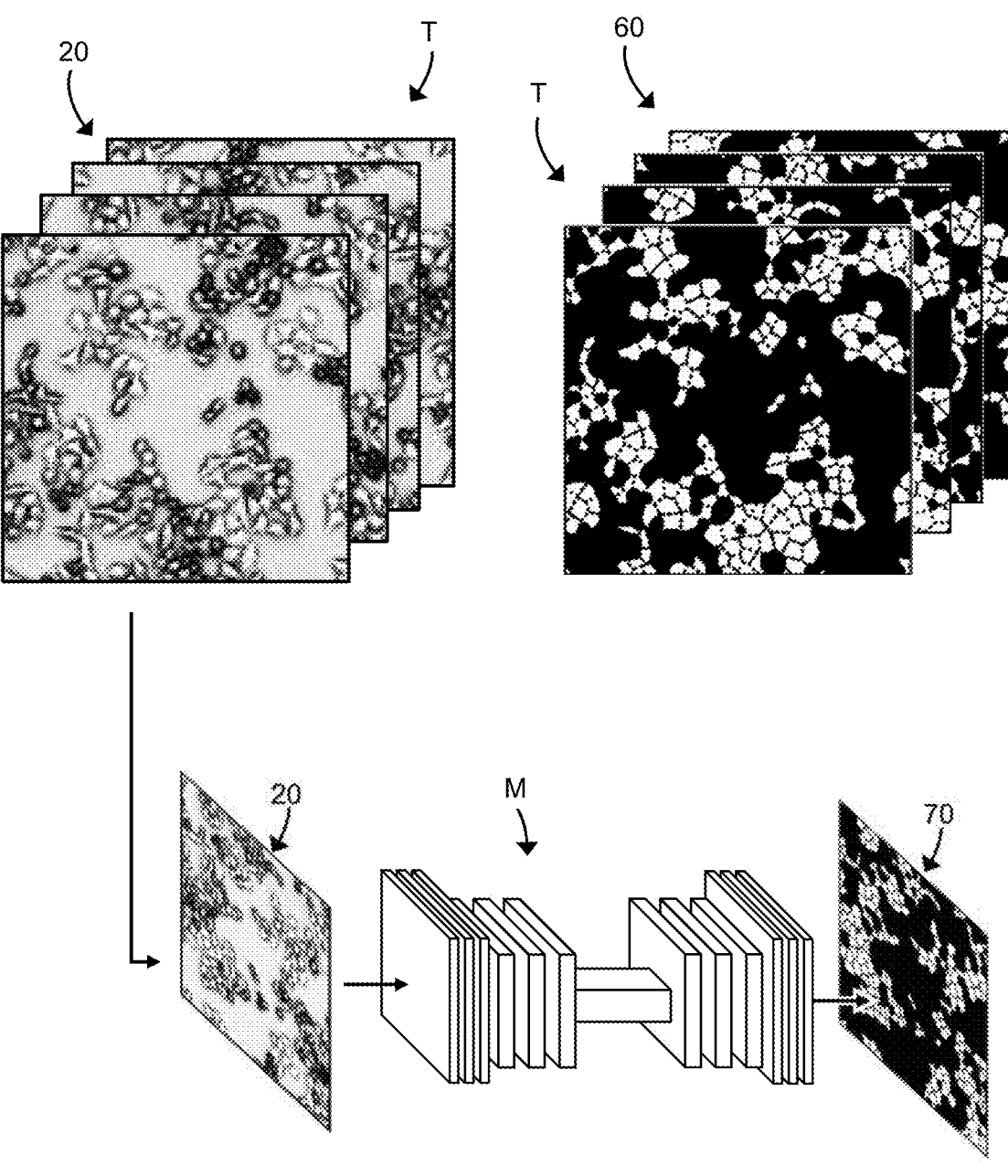
FIG. 7 schematically shows a usage of calculated instance segmentation masks for training an instance segmentation model.

FIG. 7 shows a usage of a plurality of instance segmentation masks 60 calculated in a manner according to the invention from respective microscope images 20.

The microscope images 20 and instance segmentation masks 60 can be used as training data T for an instance segmentation model M. In the training, the microscope images 20 are used as inputs into the instance segmentation model M, which calculates output images 70 therefrom. A difference between output images 70 and the instance segmentation masks 60 is utilized in order to iteratively adjust model parameter values of the instance segmentation model M. Upon completion of the training, the output images 70 constitute instance segmentation masks.

In a further optional usage of an instance segmentation mask 60, the instances 61 are cut out with pixel precision and input into an image processing program. The image processing program thus only receives the image pixels of a specific instance 61 and no surrounding pixels. For example, the image processing program can be designed to determine an object state, for example for the determination of a cell stage in the case of a biological cell as the object.

The variants described in relation to the different figures can be combined with one another. The described example embodiments are purely illustrative and variants of the same are possible within the scope of the attached claims.

LIST OF REFERENCE SIGNS

1 Microscope
2 Stand
3 Objective revolver
4 (Microscope) objective
5 Illumination device
6 Sample stage
7 Sample carrier
8 Microscope camera
9 Overview camera
9A Field of view of the overview camera
9B Mirror
10 Computing device
11 Computer program
12 Touchscreen
20 Microscope image
21 Objects
21' Cells
22 Background in the microscope image 20
25, 26, 27, 28 Pixels of the microscope image 20
30 Object center image
31, 31A, 31B Object centers
31' Voronoi sites
40 Confluence image
41 Image areas covered by objects
42 Background in the confluence image
50 Voronoi partition (Voronoi diagram)
50A Enlarged section of the Voronoi diagram 50
51, 51A, 51B Voronoi regions
52, 52A, 52B Boundaries between Voronoi regions determined with a Euclidean metric
52' Boundary between Voronoi regions determined with a metric weighted by pixel brightness
60 Instance segmentation mask
61 Instances of objects
62 Background in the instance segmentation mask 60
70 Output image
100 Microscopy system
M Instance segmentation model
P1-P4 Processes of an example method according to the invention
T Training data

What is claimed is:

1. A computer-implemented method for an instance segmentation of at least one microscope image showing a plurality of objects, comprising:
calculating positions of object centers of the objects in the microscope image;
determining which image areas of the microscope image are covered by the objects;
calculating Voronoi regions using the object centers as Voronoi sites to determine boundaries between objects of a same class which are touching each other;
determining an instance segmentation mask at least by separating the image areas covered with the objects of the same class into different instances using boundaries of the Voronoi regions between objects of the same class;
ensuring a number of instances in the instance segmentation mask is equal to a number of the Voronoi sites, in a case where boundaries of the Voronoi regions split the image areas covered with the objects such that one of the Voronoi regions forms two separate regions, by discarding one of the two separate regions or by assigning the one of the two separate regions to one or more neighboring Voronoi regions.

2. The method according to claim 1,
wherein the boundaries of the Voronoi regions are calculated such that each boundary has a same distance to the two nearest object centers;
wherein the distance is calculated as a Euclidean distance.

3. The method according to claim 1,
wherein a metric differing from a Euclidean metric is defined as a function of pixel values of the at least one microscope image such that a distance between two pixels depends on pixel values of pixels between said two pixels;
wherein the boundaries of the Voronoi regions are calculated such that each boundary has a same distance to the two nearest object centers, wherein the distance is determined according to the metric.

4. The method according to claim 1,
wherein the boundaries of the Voronoi regions are calculated such that each boundary has a same distance to the two nearest object centers, wherein the distance is a shortest path weighted by structures in the microscope image.

5. The method according to claim 4,
wherein the objects are biological cells and wherein the structures used for a weighting in the determination of the distance are cell walls.

6. The method according to claim 1,
wherein a confidence map is calculated for the instance segmentation mask, the confidence map indicating a confidence for each pixel or instance of the instance segmentation mask,
wherein the confidence map is calculated as a function of distances of the respective pixels from neighboring object centers.

7. The method according to claim 6,
wherein, as the distance of a pixel from the nearest neighboring object center point decreases, the confidence indicated in the confidence map for that pixel increases; or
wherein the confidence map indicates a confidence for a pixel that increases in proportion to a magnitude of a difference between a distance of said pixel from the nearest object center and a distance of said pixel from a second nearest object center.

8. The method according to claim 1,
wherein, in a case where one of the Voronoi regions is separated into two separate regions in the separation of the covered image areas using the boundaries of the Voronoi regions, a correction is carried out in which a smaller region of the two separate regions is discarded or assigned to one or more neighboring Voronoi regions.

9. The method according to claim 1,
wherein the object centers and the image areas covered by objects are determined from the same microscope image.

10. The method according to claim 1,
wherein the object centers and the image areas covered by objects are determined from different microscope images, wherein the different microscope images are registered and captured with different microscopy techniques or microscope settings.

11. The method according to claim 1, wherein the instance segmentation mask is used for an object analysis in one or more of the following manners:

by cutting out image sections of the microscope image containing objects with pixel precision using the instance segmentation mask and feeding these image sections to a subsequent model for an object analysis;

by determining object sizes from the instance segmentation mask;

by tracking objects spatially over a time series;

by calculating morphological features of objects and subsequently filtering objects as a function of the morphological features; or wherein the instance segmentation mask is used for an interactive verification of data annotations by displaying the instance segmentation mask or a colored representation of the instance segmentation mask to a human for the verification of object centers.

12. The method according to claim 1, further comprising:

using the instance segmentation mask to determine errors in the calculated positions of object centers or the image areas covered by objects, wherein an error is inferred as a function of an extent to which a size or shape of an instance of the instance segmentation mask deviates from an average size or shape of the instances of the instance segmentation mask.

13. The method according to claim 1, wherein respective instance segmentation masks are calculated for a plurality of microscope images;

wherein the instance segmentation masks are used as an additional training signal in the training of an object counting model, a confluence determination model, or a common model that performs an object count and a confluence determination.

14. The method according to claim 1, wherein the microscope image and the instance segmentation mask calculated therewith are used as training data for an instance segmentation model; or wherein the instance segmentation mask calculated with the microscope image and an image which is registered in relation to the microscope image and which has been captured with a different contrast method than the microscope image are used as training data for an instance segmentation model; or wherein the method further comprises: generating bounding boxes from the instance segmentation mask and using the bounding boxes and the microscope image or an image which is registered in relation to the microscope image and which has been captured with a different contrast method than the microscope image as training data for a detection model.

15. The method according to claim 14, wherein a new instance segmentation mask is calculated from the microscope image with the instance segmentation model, wherein new positions of object centers or new image areas covered by objects are determined from the new instance segmentation mask which in turn serve as the basis for the calculation of new Voronoi regions, and wherein an updated instance segmentation mask is calculated with the new Voronoi regions.

16. The method according to claim 1, wherein the microscope image is evaluated with respect to a suitability of the objects for determining an instance segmentation mask via Voronoi regions, wherein the calculation of Voronoi regions and the determination of an instance segmentation mask only occur in the event of a suitability of the objects.

17. A non-transitory computer-readable medium storing a computer program comprising commands which, when the program is executed by a computer, cause the execution of the method according to claim 1.

18. A microscopy system including a microscope for image capture; and a computing device configured to calculate an instance segmentation of at least one microscope image showing a plurality of objects by:

calculating positions of object centers of the objects in the microscope image;

determining which image areas of the microscope image are covered by the objects;

calculating Voronoi regions using the object centers as Voronoi sites to determine boundaries between objects of a same class which are touching each other; and determining an instance segmentation mask at least by cutting a segmentation mask of the image areas covered with the objects of the same class into different instances using boundaries of the Voronoi regions between objects of the same class as cut lines.

19. The microscopy system of claim 18, wherein the computing device is configured to ensure a number of instances in the instance segmentation mask is equal to a number of the Voronoi sites, in a case where boundaries of the Voronoi regions split the image areas covered with the objects such that one of the Voronoi regions forms two separate regions, by discarding a smaller of the two separate regions or by assigning the smaller of the two separate regions to one or more neighboring Voronoi regions.

20. A computer-implemented method for an instance segmentation of at least one microscope image showing a plurality of objects, comprising:

calculating positions of object centers of the objects in the microscope image;

determining which image areas of the microscope image are covered by the objects;

calculating Voronoi regions using the object centers as Voronoi sites;

determining an instance segmentation mask by separating the image areas covered with the objects into different instances using boundaries of the Voronoi regions; and calculating a new instance segmentation mask from the microscope image using an instance segmentation model, wherein new positions of object centers or new image areas covered by objects are determined from the new instance segmentation mask which in turn serve as the basis for the calculation of new Voronoi regions, and wherein an updated instance segmentation mask is calculated with the new Voronoi regions.

* * * * *